Figure 1:
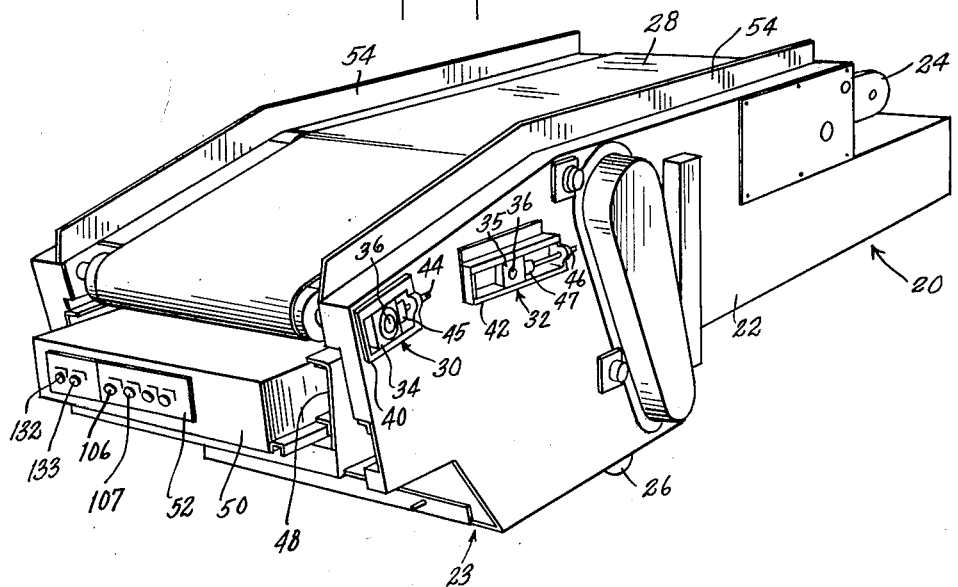

April 7, 1964  A. J. ZUERCHER  3,127,978
TELESCOPING LOADING CONVEYOR
Filed June 27, 1960  5 Sheets-Sheet 1

INVENTOR.
ANTHONY J. ZUERCHER
BY
Kenyon & Kenyon
ATTORNEYS

April 7, 1964  A. J. ZUERCHER  3,127,978
TELESCOPING LOADING CONVEYOR
Filed June 27, 1960  5 Sheets-Sheet 2
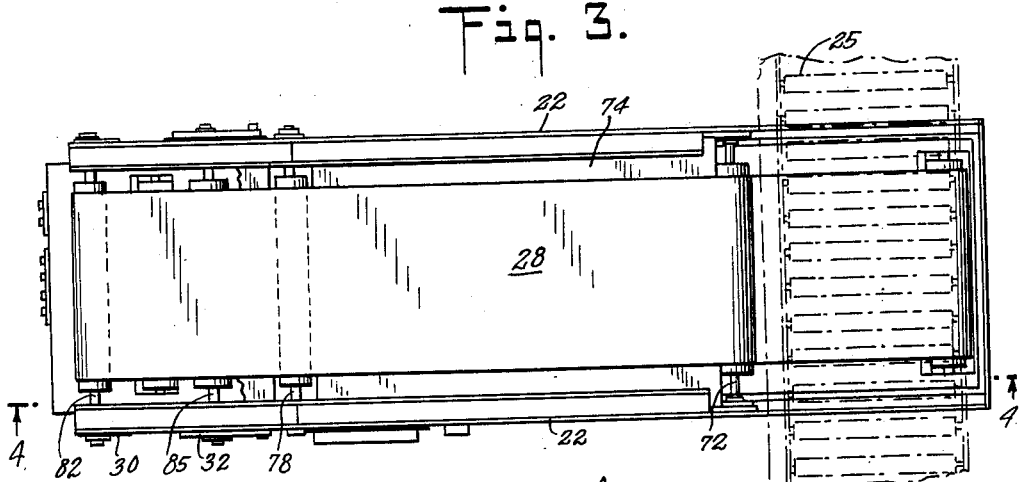
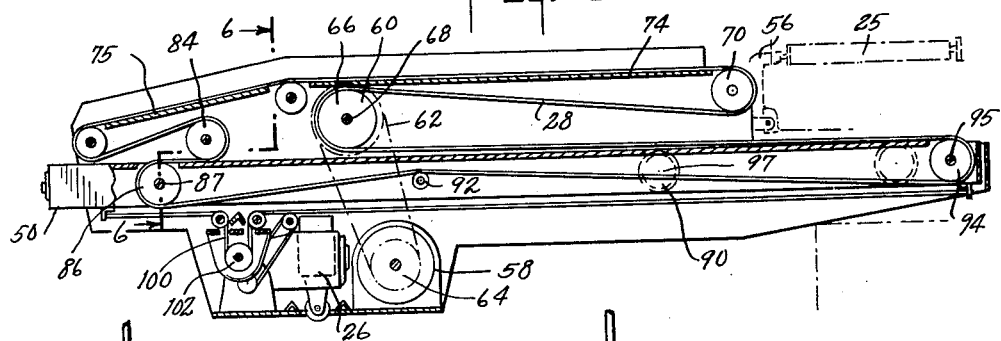
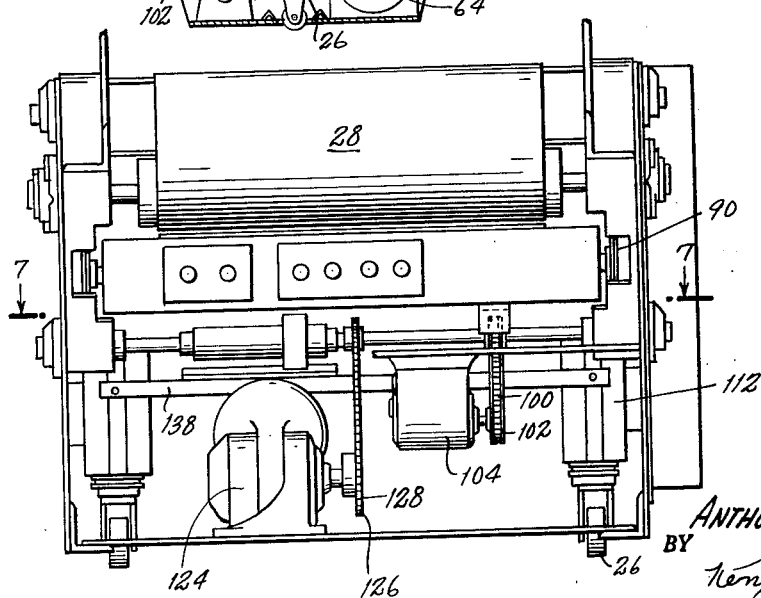
INVENTOR.
ANTHONY J. ZUERCHER
BY Kenyon & Kenyon
ATTORNEYS April 7, 1964   A. J. ZUERCHER   3,127,978
TELESCOPING LOADING CONVEYOR
Filed June 27, 1960   5 Sheets-Sheet 3
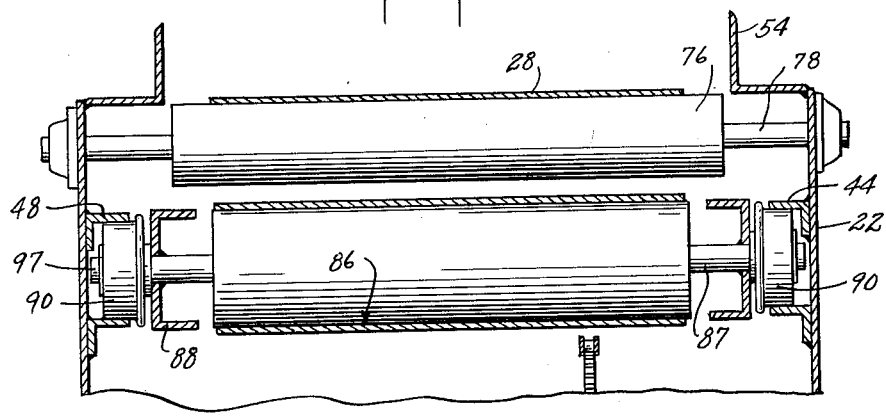
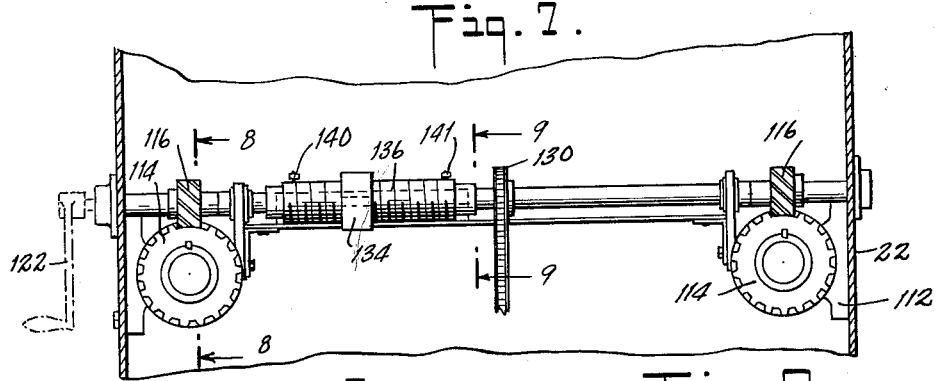
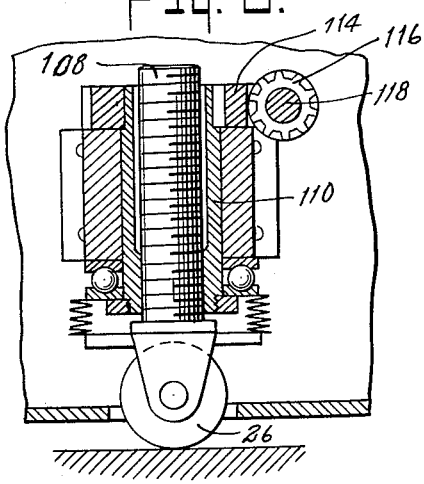
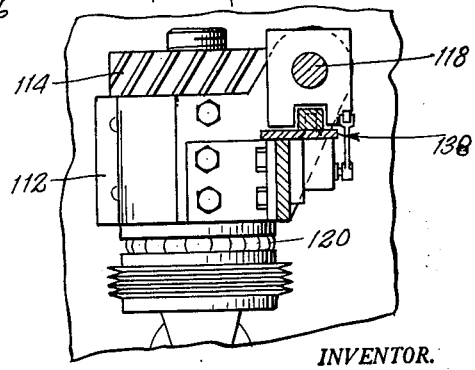
INVENTOR.
ANTHONY J. ZUERCHER
BY
Kenyon & Kenyon
ATTORNEYS April 7, 1964     A. J. ZUERCHER     3,127,978
TELESCOPING LOADING CONVEYOR
Filed June 27, 1960     5 Sheets-Sheet 4
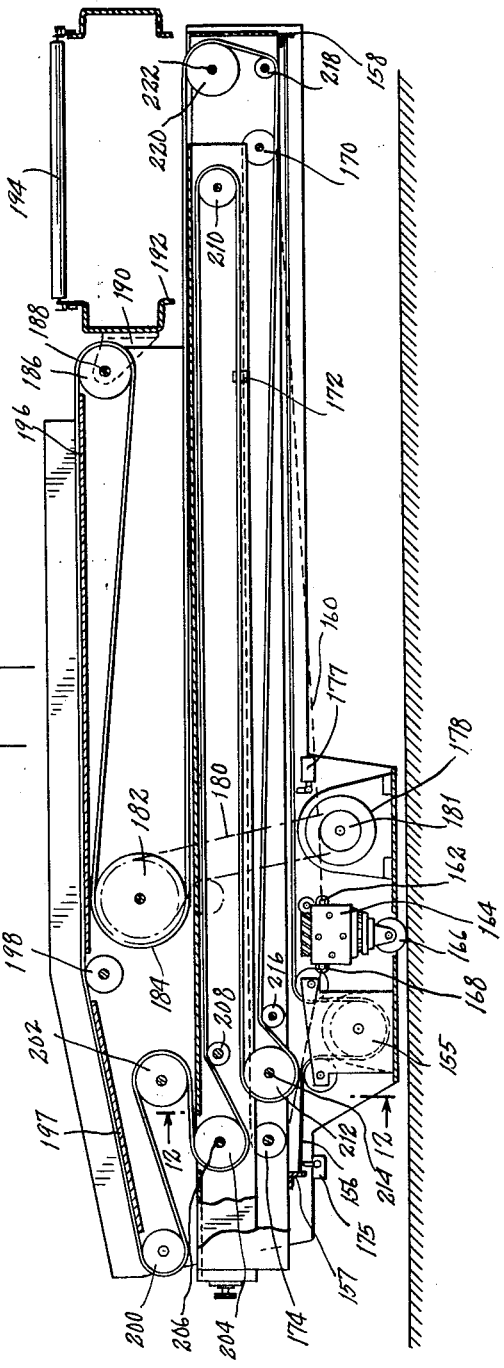
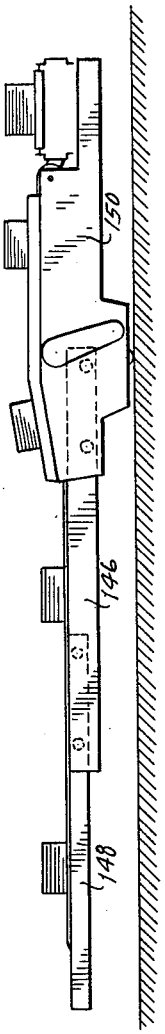
INVENTOR.
ANTHONY J. ZUERCHER
BY
ATTORNEYS

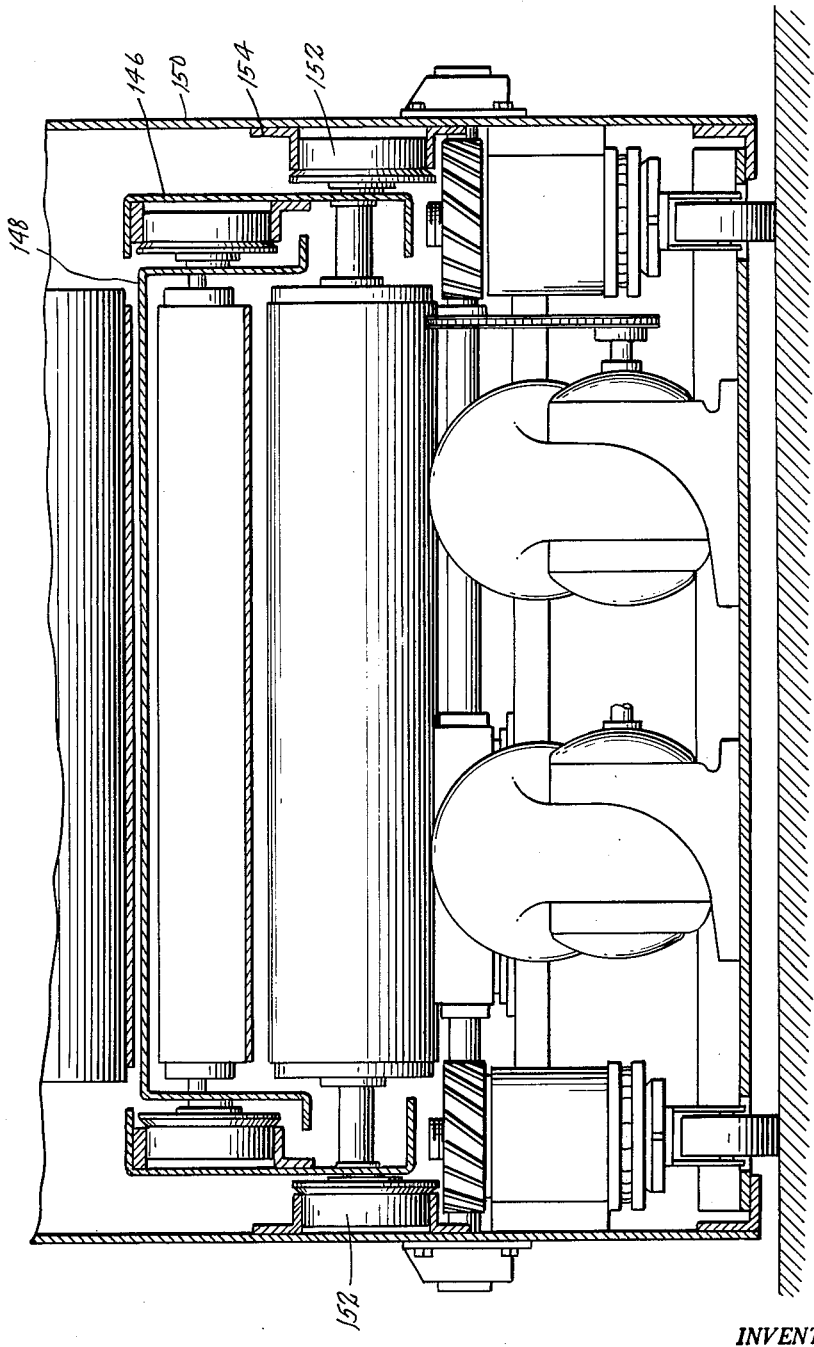

United States Patent Office 3,127,978
Patented Apr. 7, 1964

3,127,978
TELESCOPING LOADING CONVEYOR
Anthony J. Zuercher, Easton, Pa., assignor to T. W. & C. B. Sheridan Co., New York, N.Y., a corporation of New York
Filed June 27, 1960, Ser. No. 39,054
8 Claims. (Cl. 198—139)

The present invention relates to a telescoping loading conveyor apparatus. In the handling and loading of packages and boxes, one of the serious time delays and most expensive jobs involved is the necessity for each package to be separately handled in its being loaded in a truck or other delivery means. Under ordinary practice the items are carried by a conveying system to the loading dock from which each item is picked up and separately carried to its location within the delivery truck. Depending upon the size of the truck this requires a great deal of manual labor and necessarily requires much time.

Accordingly it is the object of this invention to provide a means for rapidly conveying packaged items into a truck permitting the rapid and easy loading of those items.

Another object is to provide for means which is adjustable both as to the limit to which it extends inside the truck as well as the height at which the bundles are delivered by the loading conveyor within the truck.

Briefly, the apparatus of this invention is made up of a frame which is mounted on supporting legs on one end and is attached to a dispatch conveyor or other conveyor means to the other. The device is designed to provide for a conveyor belt which acts to carry packages from the dispatch or other conveyor to a truck or the like. The dispatch conveyor may be of the type illustrated and described in my copending application Ser. No. 41,200 and the items carried on the dispatch conveyor may be newspapers or any other packaged material similar thereto. Any suitable deflecting means may be used to deflect material on the dispatch conveyor to the loading conveyor of this invention. The loading conveyor is attached to the dispatch conveyor. The supporting legs are provided with means by which the outer end or the end remote from the dispatch conveyor may be raised and lowered by varying the height of the supporting legs. Both manual and power actuated means are used for varying the height of the outer end of the device through changing the length of the supporting legs.

An endless conveyor belt of any suitable type but preferably a rubber coated fabric is provided. The belt is driven by a separate motor and operates under the control of the person who is loading the truck and is using the conveyor of this invention. A telescoping section or sections are provided which have the belt passing over pulleys carried therein. The operator controls the amount of the telescoping section which extends out from the end of the supporting frame. The amount of extension is controlled by means of a hip switch so that the operator can handle the bundles without having to put the bundle down to operate the extension and retraction of the conveyor device of this invention.

In normal usage the operator will position his truck at the loading dock and will extend the loading conveyor of this invention within his truck so that its discharge end is directly adjacent the area where he wants to begin his loading. The height will be selected which will be most convenient and which will require the least amount of moving of the packages and bundles carried by the loading conveyor. The operator receives the bundles as they are carried by the conveyor and loads them in his desired sequence. As the truck is loaded from front to back, the operator successively operates the extending or retracting switches so that the bundles being delivered will always be at a location adjacent to that portion of the truck in which the loader is working. At any desired time the discharge end may be raised or lowered so that the minimum amount of lifting or lowering is required.

It will thus be seen that a convenient and rapid means of loading trucks and the like has been provided by the device of this invention which will greatly reduce the amount of labor required in the handling and loading of packages, boxes and the like.

The device of this invention is particularly suitable for use in the system described in my copending application Serial No. 41,189 which is primarily designed to handle bundled newspapers.

Additional advantages will appear in the detailed description of the embodiment of this invention as illustrated in the drawings and described below.

Figure 2:
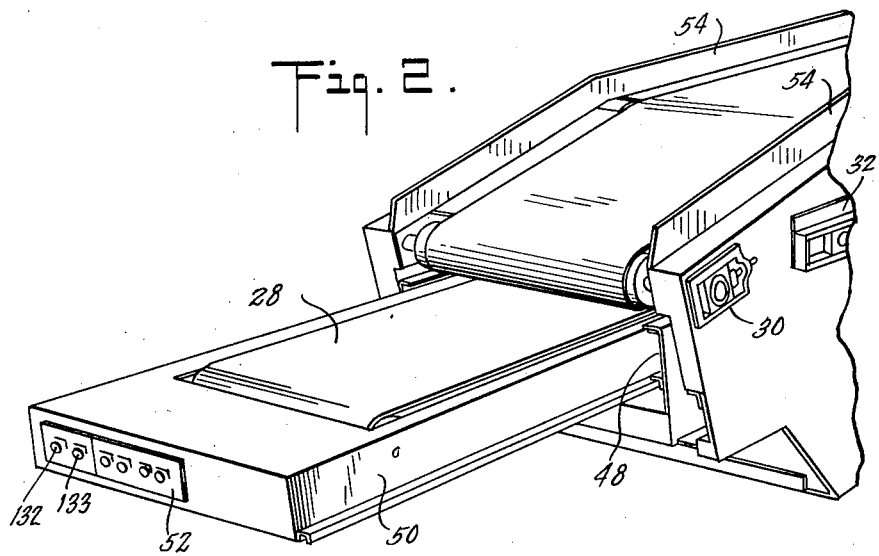

In the drawings:
FIG. 1 is a perspective of the loading conveyor of this invention in its retracted position;
FIG. 2 is a perspective of the device shown in FIG. 1 illustrating the device in its partially extended position;
FIG. 3 is a plan view of the device illustrated in FIG. 1;
FIG. 4 is a cross sectional elevation view of the device shown taken on the lines 4—4 of FIG. 3;
FIG. 5 is a front end view of the device shown in FIG. 3;
FIG. 6 is a partial cross sectional view taken on the lines 6—6 of FIG. 4;
FIG. 7 is a cross sectional plan view taken on the lines 7—7 of FIG. 5;
FIG. 8 is a cross sectional elevational view taken on the lines 8—8 of FIG. 7;
FIG. 9 is a cross sectional view taken on the lines 9—9 of FIG. 7;
FIG. 10 is a cross sectional elevational view of the second stage embodiment of this invention;
FIG. 11 is an elevational view of the device shown in FIG. 10 in its extended position; and
FIG. 12 is a cross sectional front view taken on the lines 12—12 of FIG. 10.

Referring now to the figures the loading conveyor of this invention is provided with side frames 22 in which are carried all of the various components. Cross members 23 are provided within the frames 22 in order to provide for structural rigidity of the device. One end of the frames 22 is attached by means of a bracket 24 to the frame of a conveyor 25. A pair of supporting legs 26 are provided, as more clearly are shown in FIG. 4. The frames 22 support a plurality of shafts on which are mounted rollers and around which passes the endless belt which performs the conveying portion along the conveyor device 20 of this invention. As illustrated at 30 and 32 the location of the shafts is adjustable so as to maintain the tension on the belt at the desired point. The position of the shafts is governed by sliding blocks 34, 35 in which is journalled the ends of the shafts 36, 38. The sliding blocks are in turn carried within the rectangular frame members 40, 42 and are movable therein. Threaded rods 44, 46 are provided which have heads 45, 47 so that when the threaded rods 44, 46 are rotated the position of the sliding blocks 34, 35 may be varied.

The frame 22 also carries support channels 48 which support the telescoping section 50, of the conveyor device 20 shown in FIG. 1. The telescoping section 50 is free to move within the channels 48 and is supported thereby. A control panel 52 is positioned on the outer end of the telescoping section 50 on which are provided the various controls for operating the loading conveyor device 20 of this invention.

Guide rails 54 are provided on each side of the frames 22 which operate to insure the passage of material along the belt 28.

As shown in FIGS. 3 and 4 the frame 22 is pivotally attached to the frame of a dispatch conveyor 25 by means of bracket 24. The frame extends beneath the conveyor 25 as shown, material being carried along the conveyor 25 is deflected by means of any suitable deflector device such as, for example, that illustrated and described in my copending application Serial No. 39,055, now Patent No. 3,104,755, which operates to deflect the material on the conveyor 25 across the skid plate 56 and onto the belt 28. The belt 28 is driven by conveyor drive motor 58 positioned within the frame as shown in FIG. 4. A sprocket 60 is driven by the chain 62 which passes around the drive wheel 64 of the conveyor belt motor 58. The belt 28 passes around the drive roller 66 which is rigidly attached to the shaft 68 to which is also rigidly attached the drive chain sprocket 60. In order that the conveying direction of the belt 28 be outward in the direction shown in FIG. 3 the rotation of the sprocket 60 will be clockwise. The belt 28 passes over support roller 70 which is mounted on shaft 72 journalled in the frame 22 at a position adjacent the conveyor 25. The belt passes over the top of support plate 74 which is carried by the frames 22. As the belt passes along over the support plate 74 it passes over support roller 76 mounted on shaft 78 journalled in frame 22. Another support plate 75 is placed at an incline as shown in FIG. 4. The end support roller 80 is mounted on shaft 82, again carried by the frame 22, and the belt 28 passes therearound to an adjustable support roller 84 mounted on shaft 85 which is journalled on frames 22. The ends of shafts 82—85 are carried by the adjustable means 30, 32 illustrated in FIGS. 1 and 2. By adjusting the space between these rollers it is possible to maintain the proper tension in the belt 28.

The belt 28 after passing over the takeup roller 84 wraps around roller 86 mounted on a shaft 87 which is journalled on the frame 88 of the telescoping section 50. From there, the belt 28 passes over an idler roller 92, which is also journalled on frame 88, then around an end roller 94 mounted on a shaft 95 which is also journalled in the frame. The belt 28 completes its circuit when it passes over roller 66 at the point of origin.

The telescoping section 50 is carried on four support rollers 90, two of which are journalled on the outer ends of each of the axles 97. The axles 97 are secured in the frame 88. The support rollers are fitted in ways which are formed by channels 48 to permit the horizontal inward and outward movement of the telescoping section 50.

The inward and outward movement of the telescoping section 50 is accomplished by means of a chain 100, which is attached to the drive shaft of the telescoping motor 104. Telescoping motor 104 is carried by the frame as shown in FIG. 5. The motor 104 is a reversing motor and is operated by extending and retracting switches 106, 107 on the control panel 52. It will be appreciated that by operating the controls for the telescoping motor 104 so that the sprocket 102 rotates clockwise, as seen in FIG. 4, the telescoping section 50 will be pulled outwardly and thus moved to the extended position shown in FIG. 2. Conversely the counterclockwise rotation of the sprocket 102 will operate to retract the telescoping section 50.

The pushbutton control 107 for retracting the telescopic section 50 is preferably a hip switch which permits the operator to manipulate the retraction of the telescopic section 50 without the use of his hands which will normally be occupied depositing bundles carried to him by the device. Switches 106 are of a conventional design.

The supporting legs 26 are mounted on threaded shafts 108 which are carried in collars 110 journalled in leg supports 112. Leg supports 112 are in turn rigidly attached to the frame 22. A gear 114 attached to collar 110 is provided which meshes with the threads on shaft 108. Worm gear 116, rigidly attached to elevating shaft 118, drives the gear 114. The rotation of the collar 110 is on bearings 120. Shaft 118 is journalled in the frames 22 as shown and extends from one side to the other. The shaft 118 may be rotated by hand crank 122 if desired. However, it is preferable to provide for a reversing motor 124 which has a sprocket 126 attached to its driving shaft for this purpose. A chain 128 connects the elevating motor sprocket 126 to the elevating shaft sprocket 130. Operation of the elevating motor 124 by means of switches 132, 133 operates to raise and lower the frame 22. This is accomplished since rotation of the shaft 118 by the elevating motor rotates gear 116 and hence its meshing gears 114. Rotation of the meshing gears 114 forces the collars 110 and supports 112 to move up and down depending on the direction of rotation of the shaft 118.

A limiting collar 134 attached to a threaded portion 136 of the shaft 118 is slidably attached to a support 138. As the shaft 118 is rotated the collar 134 is driven to the right or to the left depending upon the rotation of the shaft 118. Limit switches 140, 141 are provided so that when the limit of elevating movement has been reached the operation of the elevating motor 124 will be stopped automatically.

The device described above has a one stage telescoping section 50. In certain instances and for loading large trucks it is desirable to provide a two or more stage device. A two stage device is illustrated in FIGS. 10 through 12. Its operation is somewhat similar to that shown in FIG. 1 through FIG. 9. In particular the operation of the elevating portion of the device is the same. However in order to accommodate for the two separate stages of the telescoping section is is necessary to provide for a different means of extending and retracting the two stages simultaneously and for a different arrangement of the belt 28.

Referring now to FIG. 10 it will be seen that there are two separate stages provided in that the two telescoping sections 146, 148 are carried within the frame 150. As may be seen clearly in FIG. 12 the frame of the first stage is mounted on support rollers 152, which are supported by channels 154 on the frame 150. The first stage telescoping section 146 is driven by means of a chain 156 rigidly attached on one end to bracket 157 and on the other end to bracket 158. As before the telescoping motor 155 is again reversing in its operation so that the driving of the chain 156 will cause the extension and retraction of the first stage telescoping section 146.

In order to move the second stage telescoping section 147 by an amount corresponding to the first stage telescoping section 146 a cable 160 is provided. One end of the cable 160 is attached by means of a bracket 162 to one side of the support 164 for the elevating legs 166, while the other is attached to another bracket 168 on the other side of the support 164. The cable 160 passes around a roller 170 which is journalled in the first stage telescoping section 146 to a block 172 rigidly attached to the frame 148 of the telescoping section 146. The cable also passes around a second roller 174 mounted in the frame of the first stage telescoping section 146.

Thus when the chain 156 is driven by the motor 155 in a counterclockwise direction, the portion of the chain to the right as shown in FIG. 10 will be placed in tension causing the first stage telescoping section 146 to be driven to the left.

The movement of the first stage telescoping section 146 to the left carries with it the rollers 170 and 174 around which passes the cable 160 which is anchored to the second stage telescoping section 146. Since both of the sections are tied together by the cable 160 as the first stage is extended the second stage will be extended by a corresponding amount. Extending the first stage section 146 displaces the pulley 170 thereby extending the cable span between the pulleys 174 and 170 and thus creating the force which causes it to displace the second stage telescoping section 148. Limit switches 175 and 177 are located at the extreme position of the first stage's position and thus provide electrical interlocks which prevent damage to the device due to extending the telescoping sections beyond their designed limits. Limit switches 175 and 177 are actuated by the anchors 157 and 158 and act to stop the operation of the telescoping motor 178.

The belt 176 is driven by a belt drive motor 178 by means of a chain 180 which passes between sprockets 181 and 182. Sprocket 182 is attached to the drive roller 184 which serves to drive the belt 176. As before the belt 176 passes around a roller 186 which is attached to the shaft 188 adjacent the support brackets 190 attached to the frame 192 of the conveyor 194. The belt 176 passes over support plate 196, over roller 198, over support plate 197 around roller 200 and roller 202. All of the above mentioned rollers are mounted on shafts which are journalled in the frame 150 of the device illustrated in FIGS. 10 through 12.

The belt 176 after passing around roller 202, passes around roller 204 journalled on shaft 206 which is journalled in the frame 149 of the second stage telescoping section 148. Idler rollers 208 and 210 are journalled in the frame 149 of telescoping section 148 and support the belt. The belt 176 passes around roller 212 journalled on a shaft on frame 147 of the first stage telescoping section 146. Support roller 216 supports the belt as it passes along the length of the first stage telescoping section 146 to the idler roller 218 also journalled in the frame 147 of the first stage telescoping section 146 and around the end roller 220 to shaft 222 at the inner end of the first stage telescoping section 146. The belt 176 then passes over the top of the second stage telescoping section 148 and back to the drive roller 184.

It will thus be seen that the operation and support of the endless belt 176 in this embodiment is similar to the embodiment before except for such details as are dictated by the presence of a second telescoping stage 148.

The operator controls described above permit the loader to extend or retract the discharge end of the loading conveyor, to elevate or lower the discharge end to the most convenient height and to start or stop the belt drive motors as desired. Thus the device of this invention eliminates nearly all of the manual labor heretofore required for loading, as well as making possible greatly increased efficiency and speed of a loading operation.

Having thus described my preferred embodiments, I claim:

1. A loading conveyor device having side frame members and cross members joining said side frame members, support legs for said frame members carried thereon at a location adjacent one end of said frame members, the other end of said frame members being pivotally mounted on the frame of a separate conveyor system, and operator controlled elevating means for raising and lowering said side frame members; at least one telescoping section means supported by said side frame members and operator controlled means for extending and retracting said telescoping section means to position the discharge end thereof at varying distances from the outer end of said frame members; continuous belt means carried on belt support rollers journalled in both said side members and said telescoping section means for providing a conveying surface from the end of said device adjacent said separate conveyor system to the discharge end of said device, driving means for said belt means and operator controlled means for starting and stopping the movement of said continuous belt means, said elevating control means, extending and retracting means and said starting and stopping means comprising individual switch means, all of which are carried on the discharge end of said telescoping section means.

2. A loading conveyor device having side frame members and cross members joining said side frame members, support legs for said frame members carried thereon at a location adjacent one end of said frame members, the other end of said frame members being pivotally mounted on the frame of a separate conveyor system, and operator controlled elevating means for raising and lowering said side frame members; at least one telescoping section means supported by said side frame members and operator controlled means for extending and retracting said telescoping section means to position the discharge end thereof at varying distances from the outer end of said frame members; continuous belt means carried on belt support rollers journalled in both said side members and said telescoping section means for providing a conveying surface from the end of said device adjacent said separate conveyor system to the discharge end of said device, driving means for said belt means and operator controlled means for starting and stopping the movement of said continuous belt means, said elevating means including a threaded shaft portion on said support legs, threaded collar means rotatably carried on said side members positioned around said threaded shaft portion of said legs, an elevating shaft, an elevating motor having a connecting means for driving said elevating shaft and gear means for transferring the rotation of said elevating shaft to said threaded collar to effect the raising and lowering of said side frame members, depending on the direction of rotation of said elevating shaft, said elevating control means, extending and retracting means and said starting and stopping means comprising individual switch means, all of which are carried on the discharge end of said telescoping section means.

3. A loading conveyor device having side frame members and cross members joining said side frame members, support legs for said frame members carried thereon at a location adjacent one end of said frame members, the other end of said frame members being pivotally mounted on the frame of a separate conveyor system, and operator controlled elevating means for raising and lowering said side frame members; at least one telescoping section means supported by said side frame members and operator controlled means for extending and retracting said telescoping section means to position the discharge end thereof at varying distances from the outer end of said frame members; continuous belt means carried on belt support rollers journalled in both said side members and said telescoping section means for providing a conveying surface frbom the end of said device adjacent said separate conveyor system to the discharge end of said device, driving means for said belt means and operator controlled means for starting and stopping the movement of said continuous belt means, said side frame members having channel means thereon, said telescoping section means belt support rollers being journalled on axles carried by said telescoping section means, said axles having telescoping section rollers journalled thereon, said rollers being carried in said channel means and thereby supporting said telescoping section for extension and retraction thereof, said elevating control means, extending and retracting means and said starting and stopping means comprising individual switch means, all of which are carried on the discharge end of said telescoping section means.

4. A loading conveyor device having side frame members and cross members joining said side frame members, support legs for said side members carried thereon at a location adjacent one end of said frame members, the other end of said frame members being pivotally mounted on the frame of a separate conveyor system, and operator controlled elevating means for raising and lowering said side frame members; at least one telescoping section means supported by said side frame members and operator controlled means for extending and retracting said telescoping section means to position the discharge end thereof at varying distances from the outer end of said frame members; continuous belt means carried on belt support rollers journalled in both said side members and said telescoping section means for providing a conveying surface from the end of said device adjacent said separate conveyor system to the discharge end of said device, driving means for said belt means and operator controlled means for starting and stopping the movement of said continuous belt means, said extending and retracting means comprising a chain attached to the ends of said telescoping section means and an operator controlled reversing drive motor having a sprocket on its drive shaft, said chain passing around said sprocket and being driven thereby to extend and retract said telescoping section means depending on the direction of operation of said drive motor, said elevating control means, extending and retracting means and said starting and stopping means comprising individual switch means, all of which are carried on the discharge end of said telescoping section means.

5. A loading conveyor device having side frame members and cross members joining said side frame members, support legs for said side members carried thereon at a location adjacent one end of said frame members, the other end of said frame members being pivotally mounted on the frame of a separate conveyor system, and operator controlled elevating means for raising and lowering said side frame members; a plurality of telescoping section means supported by said side frame members and operator controlled means for extending and retracting said telescoping section means to position the discharge end thereof at varying distances from the outer end of said frame members; continuous belt means carried on belt support rollers journalled in both said side members and said telescoping section means for providing a conveying surface from the end of said device adjacent said separate conveyor system to the discharge end of said device, driving means for said belt means and operator controlled means for starting and stopping the movement of said continuous belt means, said extending and retracting means comprising a chain attached to the ends of a first one of said telescoping sections and an operator controlled reversing drive motor having a sprocket on its drive shaft, said chain passing around said sprocket and being driven thereby to extend and retract said telescoping sections depending on the direction of said drive motor, said telescoping sections having interconnecting cable means for moving each other by an amount equal in direction and distance to the movement of said first telescoping section means, said elevating control means, extending and retracting means and said starting and stopping means comprising individual switch means, all of which are carried on the discharge end of said telescoping section means.

6. A loading conveyor device having side frame members and cross members joining said side frame members, support legs for said side members carried thereon at a location adjacent one end of said frame members, the other end of said frame members being pivotally mounted on the frame of a separate conveyor system, and operator controlled elevating means for raising and lowering said side frame members; a plurality of telescoping section means supported by said side frame members and operator controlled means for extending and retracting said telescoping section means to position the discharge end thereof at varying distances from the outer end of said frame members; continuous belt means carried on belt support rollers journalled in both said side members and said telescoping section means for providing a conveying surface from the end of said device adjacent said separate conveyor system to the discharge end of said device, driving means for said belt means and operator controlled means for starting and stopping the movement of said continuous belt means, said extending and retracting means comprising a chain attached to the ends of a first one of said telescoping sections and an operator controlled reversing drive motor having a sprocket on its drive shaft, said chain passing around said sprocket and being driven thereby to extend and retract said telescoping section depending on the direction of operation of said drive motor, said telescoping sections having interconnecting cable means for moving each other by an amount equal in direction and distance to the movement of said first telescoping section means, said elevating means including said support legs having a threaded shaft portion, threaded collar means rotatably carried on said side members positioned around said threaded shaft portion of said legs, an elevating shaft, an elevating motor having a connecting means for driving said elevating shaft and gear means for transferring the rotation of said elevating shaft to said threaded collar to effect the raising and lowering of said side frame members depending on the direction of rotation of said elevating shaft, said elevating control means, extending and retracting means and said starting and stopping means comprising individual switch means, all of which are carried on the discharge end of said telescoping section means.

7. A loading conveyor device having side frame members and cross members joining said side frame members, support legs for said frame members carried thereon at a location adjacent one end of said frame members, the other end of said frame members being pivotally mounted on the frame of a separate conveyor system, and operator controlled elevating means for raising and lowering said frame members; a plurality of telescoping section means supported by said frame members and operator controlled means for extending and retracting said telescoping section means to position the discharge end thereof at varying distances from the outer end of said frame members; continuous belt means carried on belt support rollers journalled in both said frame members and said telescoping section means for providing a conveying surface from the end of said device adjacent said separate conveyor system to the discharge end of said device, driving means for said belt means and operator controlled means for starting and stopping the movement of said continuous belt means, said extending and retracting means comprising a chain attached to the ends of a first one of said telescoping section means and an operator controlled reversing drive motor having a sprocket on its drive shaft, said chain passing around said sprocket and being driven thereby to extend and retract said telescoping section means, cable means for interconnecting the other of said telescoping means with the first of said telescoping section means, the ends of said cables being attached to said frame members and passing around support pulleys carried by said first of said telescoping section means and around cable support pulleys journalled in the end of each of said other telescoping section means whereby each of said other telescoping section means is moved an amount and distance corresponding to the movement of said first telescoping section means by said chain and said extending and retracting drive motor, said elevating control means, extending and retracting means and said starting and stopping means comprising individual switch means, all of which are carried on the discharge end of said telescoping section means.

8. A loading conveyor device having side frame members and cross members joining said side frame members, support legs for said frame members carried thereon at a location adjacent one end of said frame members, the other end of said frame members being pivotally mounted on the frame of a separate conveyor system, and operator controlled elevating means for raising and lowering said frame members; a plurality of telescoping section means supported by said frame members and operator controlled means for extending and retracting said telescoping section means to position the discharge end thereof at varying distances from the outer end of said frame members; continuous belt means carried on belt support rollers journalled in both said side members and said telescoping section means for providing a conveying surface from the end of said device adjacent said separate conveyor system to discharge end of said device, driving means for said belt means and operator controlled means for starting and stopping the movement of said continuous belt means, said extending and retracting means comprising a chain attached to the ends of a first one of said telescoping section means and an operator controlled reversing drive motor having a sprocket on its drive shaft, said chain passing around said sprocket and being driven thereby to extend and retract said telescoping section means, cable means for interconnecting the other of said telescoping means with the first of said telescoping section means, the ends of said cables being attached to said side frame members and passing around support pulleys carried by said first of said telescoping section means and around cable support pulleys journalled in the end of each of said other telescoping section means whereby each of said other telescoping section means is moved an amount and distance corresponding to the movements of said first telescoping section means by said chain cable by extending and retracting drive motor, said frame members having channel means thereon for supporting said first telescoping section means during the extending and retraction thereof, and each of the other of said telescoping means being supported on channel means carried by each of said first telescoping means for supporting them during their extending and retracting movement, said elevating control means, extending and retracting means and said starting and stopping means comprising individual switch means, all of which are carried on the discharge end of said telescoping section means.

References Cited in the file of this patent

UNITED STATES PATENTS

| | | |
|---|---|---|
| 1,891,687 | Norman | Dec. 20, 1932 |
| 2,609,910 | Lee | Sept. 9, 1952 |
| 2,631,715 | Vickers | Mar. 17, 1953 |
| 2,721,645 | Eberle | Oct. 25, 1955 |

OTHER REFERENCES

Oliver Corp., Bulletin No. 439–553–S–3M; received in Patent Office May 22, 1953.